(12) United States Patent
Veilleux, Jr. et al.

(10) Patent No.: US 12,404,808 B2
(45) Date of Patent: Sep. 2, 2025

(54) MULTI TEMPERATURE GENERATOR AND ENGINE SHARED OIL

(71) Applicant: Hamilton Sundstrand Corporation, Charlotte, NC (US)

(72) Inventors: Leo J. Veilleux, Jr., Wethersfield, CT (US); David M. Kucharski, Delavan, WI (US); Kyle Ives, Loves Park, IL (US); Naison E. Mastrocola, Goshen, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/410,666

(22) Filed: Jan. 11, 2024

(65) Prior Publication Data
US 2025/0230772 A1    Jul. 17, 2025

(51) Int. Cl.
| F02C 7/06 | (2006.01) |
| F01M 1/10 | (2006.01) |
| F01M 1/16 | (2006.01) |
| F01M 5/00 | (2006.01) |
| F01M 9/10 | (2006.01) |

(52) U.S. Cl.
CPC ............. F02C 7/06 (2013.01); F01M 1/16 (2013.01); F01M 9/106 (2013.01); F01M 9/108 (2013.01); F01M 2001/1092 (2013.01); F01M 5/001 (2013.01); F01M 2005/004 (2013.01); F01M 2250/60 (2013.01); F05D 2220/32 (2013.01)

(58) Field of Classification Search
CPC . F02C 7/06; F01M 1/16; F01M 9/106; F01M 9/108; F01M 5/001; F01M 2001/1092; F01M 2005/004; F01M 2250/60; F05D 2220/32
See application file for complete search history.

(56) References Cited

U.S. PATENT DOCUMENTS

| 5,241,814 | A | 9/1993 | Butler |
| 8,893,856 | B2 | 11/2014 | Frost |
| 10,345,830 | B2 * | 7/2019 | Crowley ............... G06Q 50/06 |
| 10,408,115 | B2 | 9/2019 | Okada et al. |
| 11,018,556 | B2 | 5/2021 | Larson |
| 2006/0260323 | A1 * | 11/2006 | Moulebhar ............... F02C 6/08 60/793 |
| 2008/0121376 | A1 * | 5/2008 | Schwarz ................. F01D 25/18 165/104.28 |

(Continued)

OTHER PUBLICATIONS

Search Report issued in European Patent Application No. 25150734.9; Date of Mailing Jun. 4, 2025 (8 pages).

*Primary Examiner* — David P. Olynick
(74) *Attorney, Agent, or Firm* — CANTOR COLBURN LLP (57) ABSTRACT

A fluid delivery system is provided including a reservoir including oil, a hydraulic pump in fluid communication with the reservoir, and a heat exchanger system. The heat exchanger system is in fluid communication with the hydraulic pump, a generator, and an engine gearbox. The hydraulic pump is configured to deliver the oil to the heat exchanger system. The heat exchanger system is configured to provide the oil according to first temperature criteria to the generator and provide the oil according to second temperature criteria to the engine gearbox.

18 Claims, 2 Drawing Sheets

(56) References Cited

U.S. PATENT DOCUMENTS

| | | | |
|---|---|---|---|
| 2010/0205966 A1* | 8/2010 | Matteson | F01D 25/18 |
| | | | 60/671 |
| 2015/0361811 A1 | 12/2015 | Schwarz et al. | |
| 2016/0024968 A1 | 1/2016 | Stearns et al. | |
| 2023/0332543 A1* | 10/2023 | Bemment | F02C 7/224 |

* cited by examiner

MULTI TEMPERATURE GENERATOR AND ENGINE SHARED OIL

BACKGROUND

The present disclosure relates to heat exchangers and, in particular, to oil heat exchangers in aircraft applications.

BACKGROUND

Heat exchangers can be used in various applications, including but not limited to aerospace, refrigeration, air conditioning, space heating, electricity generation, and chemical processing applications. For example, heat exchangers can be utilized within an aircraft to transfer heat from one fluid to another. Some aircraft may use air-based or fuel-based oil coolers to extract thermal energy from oil to maintain oil within target operational temperatures. In some cases, structures associated with heat exchangers may add complexity, expense, and weight to product designs, which may be undesirable with respect to cost-sensitive, weight-sensitive, and/or space-limited applications associated with an aircraft.

BRIEF DESCRIPTION

According to an aspect of the disclosure, a fluid delivery system is provided including: a reservoir including oil; a hydraulic pump in fluid communication with the reservoir; and a heat exchanger system in fluid communication with the hydraulic pump, a generator, and an engine gearbox, wherein: the hydraulic pump is configured to deliver the oil to the heat exchanger system; and the heat exchanger system is configured to provide the oil according to first temperature criteria to the generator and provide the oil according to second temperature criteria to the engine gearbox.

In some embodiments, the generator and the engine gearbox are associated with a gas turbine engine of a vehicle.

In any one or combination of the embodiments disclosed herein, the generator and the engine gearbox are associated with an auxiliary power unit (APU) of a vehicle.

In any one or combination of the embodiments disclosed herein, the heat exchanger system includes: a first heat exchanger configured to provide the oil according to the first temperature criteria to the generator; and a second heat exchanger configured to provide the oil according to the second temperature criteria to the engine gearbox.

In any one or combination of the embodiments disclosed herein, the fluid delivery system is configured to direct a cooling medium to the first heat exchanger or the second heat exchanger based on respective priorities associated with the first heat exchanger and the second heat exchanger.

In any one or combination of the embodiments disclosed herein, the heat exchanger system includes: a heat exchanger configured to provide the oil according to the first temperature criteria to the generator and provide the oil according to the second temperature criteria to the engine gearbox.

In any one or combination of the embodiments disclosed herein, the heat exchanger system further includes: a scavenge pump in fluid communication with the generator, the engine gearbox, and the reservoir, wherein the scavenge pump is configured to: collect at least a portion of the oil from at least one of the generator and the engine gearbox; and provide at least the portion of the oil to the reservoir.

In any one or combination of the embodiments disclosed herein, the heat exchanger system further includes at least one of: a first sensor device in thermal communication with an inlet of the heat exchanger system; a second sensor device in thermal communication with a first outlet of the heat exchanger system; a third sensor device in thermal communication with a second outlet of the heat exchanger system; a fourth sensor device in thermal communication with an outlet of the engine gearbox; and a fifth sensor device in thermal communication with an outlet of the generator, wherein the fluid delivery system is configured to maintain or adjust a temperature of the oil as received at the inlet of the heat exchanger system based on temperature information provided by at least one of the first sensor device, the second sensor device, the third sensor device, the fourth sensor device, and the fifth sensor device.

In any one or combination of the embodiments disclosed herein, the heat exchanger system further includes: a sensor device in thermal communication with at least one of an outlet of the heat exchanger system and an inlet of the generator; and control circuitry coupled to the sensor device and the generator, wherein the control circuitry is configured to condition generation of electric power by the generator, based on temperature information provided by the sensor device.

According to an aspect of the disclosure, a gas turbine engine system is provided including: a gas turbine engine; a generator; an engine gearbox configured to operatively connect the gas turbine engine to the generator; and a fluid delivery system. The fluid delivery system includes: a reservoir including oil; a hydraulic pump in fluid communication with the reservoir; and a heat exchanger system in fluid communication with the hydraulic pump, the generator, and the engine gearbox, wherein: the hydraulic pump is configured to deliver the oil to the heat exchanger system; and the heat exchanger system is configured to provide the oil according to first temperature criteria to the generator and provide the oil according to second temperature criteria to the engine gearbox.

In some embodiments, the heat exchanger system includes: a first heat exchanger configured to provide the oil according to the first temperature criteria to the generator; and a second heat exchanger configured to provide the oil according to the second temperature criteria to the engine gearbox.

In any one or combination of the embodiments disclosed herein, the fluid delivery system is configured to direct a cooling medium to the first heat exchanger or the second heat exchanger based on respective priorities associated with the first heat exchanger and the second heat exchanger.

In any one or combination of the embodiments disclosed herein, the heat exchanger system includes: a heat exchanger configured to provide the oil according to the first temperature criteria to the generator and provide the oil according to the second temperature criteria to the engine gearbox.

In any one or combination of the embodiments disclosed herein, the gas turbine engine further includes: a scavenge pump in fluid communication with the generator, the engine gearbox, and the reservoir, wherein the scavenge pump is configured to: collect at least a portion of the oil from at least one of the generator and the engine gearbox; and provide at least the portion of the oil to the reservoir.

In any one or combination of the embodiments disclosed herein, the gas turbine engine further includes at least one of: a first sensor device in thermal communication with an inlet of the heat exchanger system; a second sensor device in thermal communication with a first outlet of the heat exchanger system; a third sensor device in thermal communication with a second outlet of the heat exchanger system;

a fourth sensor device in thermal communication with an outlet of the engine gearbox; and a fifth sensor device in thermal communication with an outlet of the generator, wherein the fluid delivery system is configured to maintain or adjust a temperature of the oil as received at the inlet of the heat exchanger system based on temperature information provided by at least one of the first sensor device, the second sensor device, the third sensor device, the fourth sensor device, and the fifth sensor device.

In any one or combination of the embodiments disclosed herein, the gas turbine engine further includes: a sensor device in thermal communication with at least one of an outlet of the heat exchanger system and an inlet of the generator; and control circuitry coupled to the sensor device and the generator, wherein the control circuitry is configured to condition generation of electric power by the generator, based on temperature information provided by the sensor device.

According to an aspect of the disclosure, a method of delivering a fluid to a generator and an engine gearbox of a gas turbine engine system is provided, the method including: determining, by a fluid delivery system, temperature information of oil received at an inlet of a heat exchanger system of the fluid delivery system; and maintaining or adjusting, by the fluid delivery system, a temperature of the oil based on the temperature information, wherein maintaining or adjusting the temperature of the oil includes: providing the oil to the generator according to first temperature criteria; and providing the oil to the engine gearbox according to second temperature criteria.

In some embodiments, the method further includes: collecting, by a scavenge pump of the fluid delivery system, at least a portion of the oil from at least one of the generator and the engine gearbox; and providing at least the portion of the oil to a reservoir of the fluid delivery system.

In any one or combination of the embodiments disclosed herein, the method further includes: determining, by the fluid delivery system, at least one of: second temperature information of the oil at a first outlet of the heat exchanger system; third temperature information of the oil at a second outlet of the heat exchanger system; fourth temperature information of the oil at an outlet of the engine gearbox; and fifth temperature information of the oil at an outlet of the generator, wherein maintaining or adjusting the temperature of the oil received at the inlet of the heat exchanger system is further based on at least one of the second temperature information, the third temperature information, the fourth temperature information, and the fifth temperature information.

In any one or combination of the embodiments disclosed herein, the method further includes: determining, by a sensor device, second temperature information of the oil at an outlet of the heat exchanger system; providing, by the fluid delivery system, a control signal to the generator based on the second temperature information, wherein the control signal is associated with conditioning generation of electric power by the generator.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

A detailed description of one or more embodiments of the disclosed apparatus and method are presented herein by way of exemplification and not limitation with reference to the Figures.

According to one or more embodiments of the present disclosure, a shared oil system is described which is capable of providing oil at multiple temperature outputs. In some embodiments, the shared oil system is a common oil system for an aircraft, in which the oil system includes a heat exchanger system for providing oil of different temperatures to an engine gearbox of the aircraft and a generator of the aircraft. In an example, the heat exchanger system includes a main engine heat exchanger for providing oil according to first temperature criteria (e.g., a first temperature, a first temperature range, or the like) to the engine gearbox. In some embodiments, the heat exchanger system includes an additional heat exchanger for providing oil according to second temperature criteria (e.g., a second temperature, a second temperature range, or the like) to the generator.

As will be described herein, example aspects of the shared oil system support a reduction in weight, cost, instrumentation, volume, and quantity of components compared to other techniques for providing oil of differing temperatures within an aircraft. In some aspects, example embodiments provide a shared oil system having a reduced complexity (e.g., shared oil simplicity) while being capable of providing oil according to different temperature criteria. For example, the shared oil system is capable of providing oil according to relatively higher oil temperatures for the engine gearbox and providing oil according to relatively lower temperatures for the generator (e.g., using cooler oil may extend the life of the generator).

Figure 1:
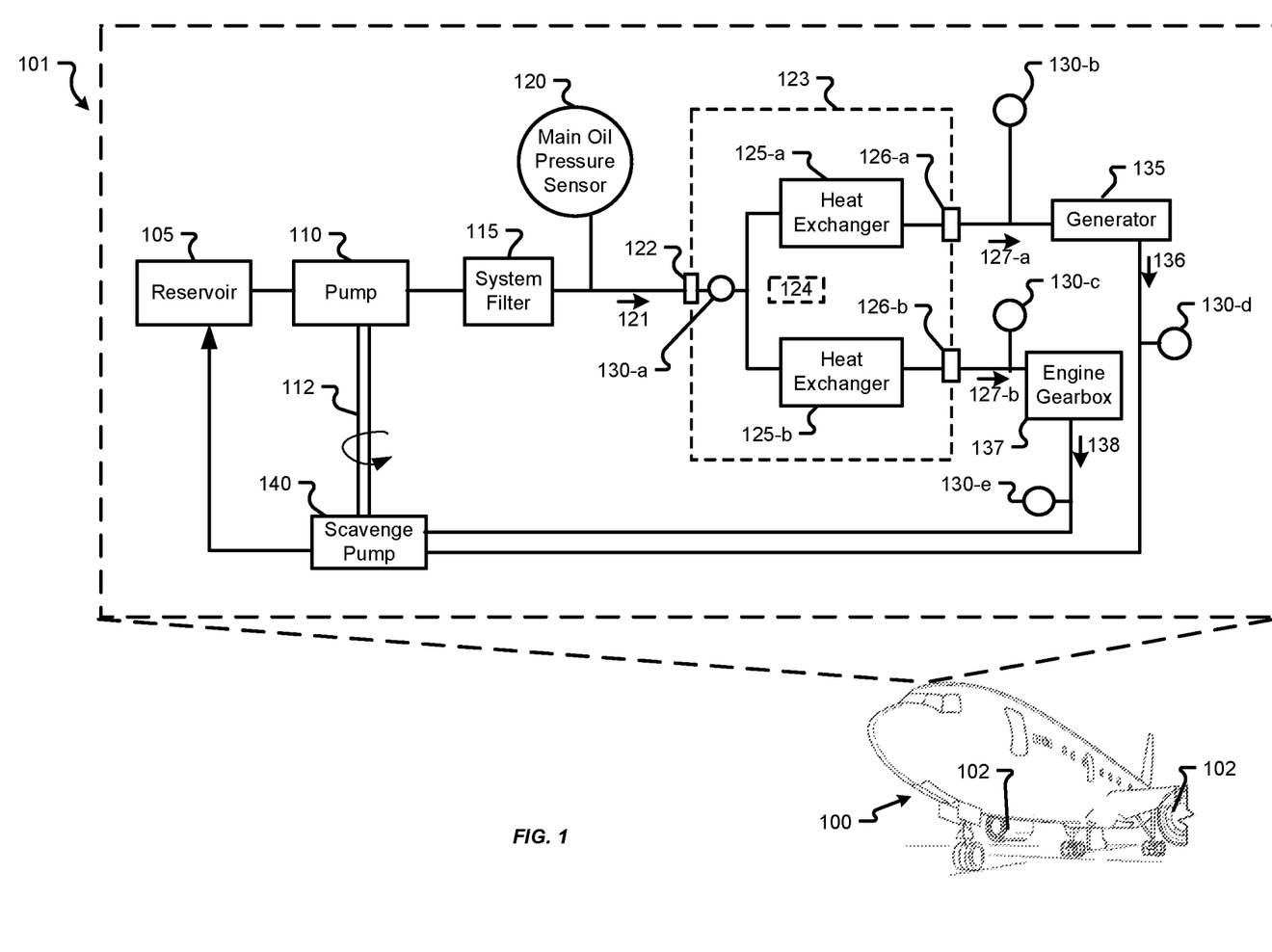
FIG. 1 is a schematic illustration of an integrated oil system in accordance with one or more embodiments of the present disclosure.

FIG. 1 is a schematic illustration of a vehicle, e.g., an aircraft 100, that can incorporate various embodiments of the present disclosure. The aircraft 100 includes an integrated oil system 101. The integrated oil system 101 is described herein as being utilized by the aircraft 100; however, the integrated oil system 101 is not limited thereto. Aspects of the present disclosure support utilizing the integrated oil system 101 in other various systems including, but not limited to, land-based vehicles and naval vessels. The integrated oil system 101 is capable of providing fluid (e.g., oil) to components of the aircraft 100. The integrated oil system 101 may be referred to herein as a fluid delivery system.

In accordance with one or more embodiments of the present disclosure, the integrated oil system 101 is capable of providing or delivering oil at different temperatures to a generator 135 and an engine gearbox 137 of the aircraft 100.

In some embodiments, the generator 135 may be capable of generating electrical power for the aircraft 100. For example, the generator 135 may be an integrated drive generator (IDG) or variable frequency generator (VFG). The generator 135 may provide electrical power to components of the aircraft 100 via an electrical system (not illustrated) of the aircraft 100. However, aspects of the present disclosure are not limited thereto, and the generator 135 may be a generator, a motor/generator, or a motor. In some aspects, the generator 135 (e.g., as a motor or motor/generator) may be capable of adding mechanical energy back to the gas turbine engine 102.

The engine gearbox 137 may be coupled to or integrated with a gas turbine engine 102 of the aircraft 100. In some embodiments, the engine gearbox 137 may be a main gearbox or an accessory gearbox capable of distributing the high-speed rotational movement generated by the gas turbine engine 102 to components included in the aircraft 100. In some examples, the engine gearbox 137 may be a mechanically driven gearbox for driving systems of the aircraft 100 such as, for example, fuel pumps, scavenge pumps (e.g., scavenge pump 140), electrical generators (e.g., generator 135), hydraulic pumps (e.g., hydraulic pump 110), and the like. For example, the engine gearbox 137 may transfer power from the main shaft of the gas turbine engine 102 to the generator 135 for electrical power. It is to be understood that the engine gearbox 137 may include, but is not limited to, any or all of the following: an engine accessory gear box and an engine main gear box (e.g., such as used to reduce or increase the fan or compressor speed or speed to accessory gearbox and bearing compartments used to support the engine rotating fan, compressor, and or turbine shafts).

The example aspects of the integrated oil system 101 are not limited to a gas turbine engine 102. For example, in some other embodiments, the generator 135 and the engine gearbox 137 described herein may be associated with an auxiliary power unit (APU) (not illustrated) of the aircraft 100. For example, the APU may include the generator 135 and the engine gearbox 137.

The integrated oil system 101 includes a reservoir 105 (also referred to herein as an oil tank or a lubricant tank), a hydraulic pump 110, a system filter 115, a main oil pressure sensor 120, a heat exchanger system 123, sensor devices 130 (e.g., temperature sensors), generator 135, engine gearbox 137, and scavenge pump 140.

The integrated oil system 101 may store solid fluids (e.g., oil) in reservoir 105. In some examples, the reservoir 105 may include a temperature transducer to monitor the temperature of fluid stored in the reservoir 105, and the reservoir 105 may include one or more vents configured to vent the reservoir 105 to atmospheric pressure. Further, the reservoir 105 may include various components to manage and/or service the oil volume therein including, but not limited to, fluid fill and spill ports, a fluid level sight glass, and a fluid drain plug.

The integrated oil system 101 includes a pump system capable of drawing in fluid (e.g., oil 121) contained in reservoir 105 and delivering the fluid to the system filter 115, and further, to the heat exchanger system 123. The pump system may include hydraulic pump 110 (also referred to herein as an oil pump) configured to deliver the fluid to the system filter 115 and/or heat exchanger system 123.

In some embodiments, the integrated oil system 101 may include a bypass valve (not illustrated) via which the integrated oil system 101 may bypass the system filter 115 (e.g., and thereby bypass oil 121 around the system filter 115) for cases in which the system filter 115 is blocked. Accordingly, for example, the integrated oil system 101 may provide the oil 121 to heat exchanger system 123, with or without filtering of the oil 121 by the system filter 115.

In some other embodiments, the integrated oil system 101 may include a bypass valve (not illustrated) via which the integrated oil system 101 may bypass the heat exchanger system 123 (e.g., and thereby bypass oil 121 around the heat exchanger system 123). For example, the integrated oil system 101 may bypass the heat exchanger system 123 based on the temperature of the oil 121. For example, the integrated oil system 101 may include a sensor device 130-*a* thermally coupled to the inlet 122 of the heat exchanger system 123 and configured to measure the temperature of the oil 121 at the inlet 122 of the heat exchanger system 123. In an example, for cases in which the temperature of the oil 121 is equal to or substantially equal to a target temperature for a target component (e.g., generator 135, engine gearbox 137), the integrated oil system 101 may provide the oil 121 to the target component, without heating or cooling of the oil 121 by the heat exchanger system 123.

Main oil pressure sensor is capable sensing pressure (e.g., increases or decreases in pressure) across the hydraulic pump 110.

The heat exchanger system 123 is capable of providing oil 127-*a* and oil 127-*b* of different respective temperatures to generator 135 and engine gearbox 137. In some embodiments, the heat exchanger system 123 may be as a single heat exchanger capable of providing oil 127-*a* and oil 127-*b*. In some other embodiments, the heat exchanger system 123 may be implemented as a heat exchanger 125-*a* and a heat exchanger 125-*b* respectively capable of providing oil 127-*a* and oil 127-*b* of different respective temperatures. It is to be understood that in the examples described herein, oil 127-*a* and oil 127-*b* may be the same as oil 121, but at different respective temperatures.

The heat exchanger system 123 may support modifying the temperature of oil 121 and outputting oil 127-*a* and oil 127-*b* of different respective temperatures. In an example, the heat exchanger system 123 may heat or cool the oil 121 to a first temperature or a first temperature range associated with lubricating the generator 135, and the heat exchanger system 123 may heat or cool the oil 121 to a second temperature or a second temperature range associated with lubricating the engine gearbox 137. In another example, the heat exchanger 125-*a* may cool the oil 121 to the first temperature or the first temperature range, and the heat exchanger 125-*b* may cool the oil 121 to the second temperature or the second temperature range.

In an example, the heat exchanger 125-*a* may be a relatively large heat exchanger capable of cooling all available oil 121 from the reservoir 105 to the first temperature or the first temperature range associated with lubricating the generator 135 (e.g., thereby providing oil 127-*a*). In the example, the heat exchanger 125-*b* may be a relatively smaller heat exchanger capable of further cooling the oil 127-*a* to the second temperature or the second temperature range associated with lubricating the engine gearbox 137 (e.g., thereby providing oil 127-*b*). In some aspects, the heat exchanger system 123 may further include one or more other one or more heat exchangers 125 (not illustrated) for further cooling the oil 127-*a* or the oil 127-*b*.

Accordingly, for example, the integrated oil system 101 may support providing any suitable quantity of streams of lubricant (e.g., oil 127-*a*, oil 127-*b*, and the like) according to respective target temperatures. For example, the integrated oil system 101 may provide, from the reservoir 105, oil according to one or more target temperatures (e.g., for generator 135, for engine gearbox 137, for other components to which oil of a given temperature is to be provided).

In some embodiments, the target temperature of the oil 121 for the heat exchanger 125-*a* and/or the heat exchanger 125-*b* may range from about 70 degrees Celsius to about 120 degrees Celsius. In an example, the first temperature range for the oil 121 and the heat exchanger 125-a may be about 70 degrees Celsius to about 120 degrees Celsius. In some examples, the second temperature range for the oil 121 and the heat exchanger 125-b may be about 70 degrees Celsius to about 120 degrees Celsius.

In some embodiments, the integrated oil system 101 may give the generator 135 priority on the incoming cooling medium (e.g., fuel, air, or the like). For example, the integrated oil system 101 is configured to direct the cooling medium to the heat exchanger 125-a or the heat exchanger 125-b based on respective priorities associated with the heat exchanger 125-a and the heat exchanger 125-b. In an example, the integrated oil system 101 may first provide the cooling medium to the heat exchanger 125-a associated with the generator 135, followed by providing the cooling medium to the heat exchanger 125-b associated with the engine gearbox 137. In an example, the temperature of the cooling medium may increase after being used at the heat exchanger 125-a, and the integrated oil system 101 may further provide the same cooling medium (in some cases, having an increased temperature) to the heat exchanger 125-b.

The heat exchangers described herein (e.g., heat exchanger system 123, heat exchanger 125-a, heat exchanger 125-b) may include any heat exchanger supportive of maintaining or adjusting the temperature of the oil 121 (also referred to herein as the oil flow of oil 121). For example, the heat exchangers described herein may be capable of heating, cooling, or maintaining the temperature of the oil 121 in association with providing corresponding oil 127-a to the generator 135 and/or providing corresponding oil 127-b to the engine gearbox 137. Aspects described herein with reference to heat exchanger system 123 may be similarly applied to heat exchanger 125-a and heat exchanger 125-b.

In some embodiments, the heat exchanger system 123 includes an air cooled oil cooler (not illustrated). In some other embodiments the heat exchanger system 123 includes a fuel cooled oil cooler (not illustrated). In some other embodiments, the heat exchanger system 123 may include an air cooled oil cooler and a fuel cooled oil cooler in a single unit.

In an embodiment, the heat exchanger system 123 may support cooling portions of the oil 121 by the air cooled oil cooler, while cooling other portions of the oil 121 by the fuel cooled oil cooler. The air cooled oil cooler may be disposed to receive an air flow (e.g., a fan air flow associated with the gas turbine engine 102, an external air flow from outside the aircraft 100, or the like). In certain embodiments, the air cooled oil cooler supports cross flow heat transfer. In certain embodiments, the fuel cooled oil cooler supports cross flow, counter flow, or parallel flow heat transfer.

In certain embodiments, the heat exchanger system 123 may include one or more paths via which the oil 121 can partially or fully bypass the heat exchanger system 123. Advantageously, the heat exchanger system 123 supports features for selectively cooling the oil 121 through various cooling paths such that the oil 121 is cooled to or remains within a target temperature or a target temperature range.

The heat exchanger system 123 includes an inlet 122 for receiving oil 121, a flow outlet 126-a for providing oil 127-a, and a flow outlet 126-b for providing oil 127-b. The heat exchanger system 123 may include one or more proportioning devices (e.g., one or more proportioning valves 124) for selectively directing portions of the oil 121 to a given component (e.g., heat exchanger 125-a, heat exchanger 125-b, air cooled oil cooler, fuel cooled oil cooler, or the like) of the heat exchanger system 123.

Non-limiting examples of heat exchanger system 123 include laminate-type heat exchangers, plate type, plate-shell type, tube type, and tube-shell type heat exchangers supportive of maintaining or adjusting (e.g., cooling, heating, or the like) the temperature of the oil 121.

The integrated oil system 101 may include sensor devices 130 (e.g., temperature sensors) capable of measuring temperatures of the oil 121, the oil 127-a, the oil 127-b, oil 136 which leaks or drains out of the generator 135, and/or oil 138 which leaks or drains out of the engine gearbox 137. In some embodiments, the sensor devices 130 can provide continuous and/or semi-continuous feedback of temperature information any of oil 121 (e.g., as received at the inlet 122 of heat exchanger system 123, as stored at reservoir 105, or the like), oil 127-a, oil 127-b, oil 136, and oil 138 to aircraft computers or any other suitable control system (including control circuitry and/or processing circuitry) associated with the aircraft 100. In some examples, the temperature information may include measured temperatures, temperature patterns, temperature statistical data, or the like of any of oil 121 (e.g., as received at the inlet 122 of heat exchanger system 123, as stored at reservoir 105, or the like), oil 127-a, oil 127-b, oil 136, and oil 138.

For example, based on temperature information (e.g., measured temperatures) provided by one or more of the sensor devices 130, the integrated oil system 101 may control one or more proportioning valves 124 in association with maintaining and/or adjusting the temperatures of oil (e.g., oil 127-a, oil 127-b) to be provided to a component of the aircraft 100. In some examples, the integrated oil system 101 may throttle one or more one or more proportioning valves 124 in association with maintaining and/or adjusting the temperatures of oil described herein.

In some aspects, based on the temperature information (e.g., measured temperatures) provided by the sensor devices 130, the integrated oil system 101 may evaluate the performance of the heat exchanger system 123 (or heat exchanger 125-a and/or heat exchanger 125-b), and the integrated oil system 101 may maintain or adjust one or more parameters of the heat exchanger system 123. Accordingly, for example, based on the temperature information provided by the sensor devices 130, the integrated oil system 101 may regulate the temperatures of the oil 127-a and/or the oil 127-b.

The scavenge pump 140 may be in fluid communication with the generator 135, the engine gearbox 137, and the reservoir 105. In some embodiments, the scavenge pump 140 may be a positive displacement scavenge pump. The integrated oil system 101 may collect, by the scavenge pump 140, leakage and drainage fluid from various portions of the integrated oil system 101 (e.g., from generator 135, from engine gearbox 137, a clutch control system (not illustrated), gear/bearing systems, or the like). In an example, the scavenge pump 140 may be driven by a rotating input shaft 112 coupled between the hydraulic pump 110 and the scavenge pump 140.

In some embodiments, the integrated oil system 101 may transfer collected oil from the scavenge pump 140 to the reservoir 105. Additionally, or alternatively, the hydraulic pump 110 may draw collected oil from the scavenge pump 140, provide the collected oil to the system filter 115, and provide the filtered oil to the heat exchanger system 123.

The example embodiments described herein support providing oil of different temperatures to other components of the aircraft 100, and it is to be understood that the techniques described herein are not limited to providing oil of different temperatures to the generator 135 and the engine gearbox 137. For example, in one or more embodiments, the integrated oil system 101 may provide oil 127-*a*, oil 127-*b*, oil of another temperature as provided by heat exchanger system 123, or a combined oil flow to an main bearings of a gas turbine engine 102 or to any other suitable component of the aircraft 100.

According to one or more additional and/or alternative embodiments supported by aspects of the present disclosure, the integrated oil system 101 may include a control loop (not illustrated) between the sensor device 130-*a* and generator 135. In some aspects, the control loop include control circuitry associated with providing power to electronic components of the aircraft 100. In some aspects, the control loop may support the conditioning of electric power provided by generator 135.

The integrated oil system 101 may be capable of providing temperature information regarding individual circuits of the integrated oil system 101 to, for example, aircraft control circuitry of the aircraft 100. In some aspects, based on the temperature information, the aircraft control circuitry may infer the health of components (e.g., generator 135, engine gearbox 137) of the integrated oil system 101 and aircraft 100.

For example, the integrated oil system 101 may include a control system (not illustrated), and the control system may determine the health of the generator 135 based on a comparison of the temperature of oil 127-*a* at an inlet of the generator 135 and the temperature of oil 136 at an outlet of the generator 135. In an example, for a condition in which the temperature of oil 136 at the outlet of the generator 135 rises, but the temperature of oil 127-*a* at the inlet of the generator 135 remains constant, the generator control system may associate the condition as a failure condition within the generator 135. Additionally, or alternatively, the control system may similarly determine the health of the engine gearbox 137 based on a comparison of the temperature of oil 127-*b* at an inlet of the engine gearbox 137 and the temperature of oil 138 at an outlet of the 137.

According to one or more embodiments of the present disclosure, the reservoir 105, the hydraulic pump 110, the system filter 115, the Component main oil pressure sensor, and the heat exchanger system 123 may be included in or integrated with the generator 135. Accordingly, for example, the integrated oil system 101 is capable of providing oil 127-*a* and oil 127-*b* of different respective temperatures to generator 135 and engine gearbox 137 (and/or other components of the aircraft 100) with a reduced number of components compared to some other systems, thereby achieving reduced complexity, expense, and weight. That is, for example, the integrated oil system 101 may be implemented without a separate reservoir (e.g., oil tank), hydraulic pump, system filter, main oil pressure sensor 120, heat exchanger, and scavenge pump for providing oil 127-*b* for the engine gearbox 137. The integrated oil system 101 mitigates the implementation of redundant components and a redundant feedback loop for providing oil 127-*b* for the engine gearbox 137. In some aspects, the integrated oil system 101 described herein support an increase in oil compatibility or overlap, for example, as the same oil type may be provided by the integrated oil system 101 to both the generator 135 and the engine gearbox 137.

Accordingly, for example, aspects of the integrated oil system 101 described herein support a reduction in total maintenance costs (TMC) and direct maintenance costs (DMC) associated with maintaining the integrated oil system 101 for the aircraft 100.

Figure 2:
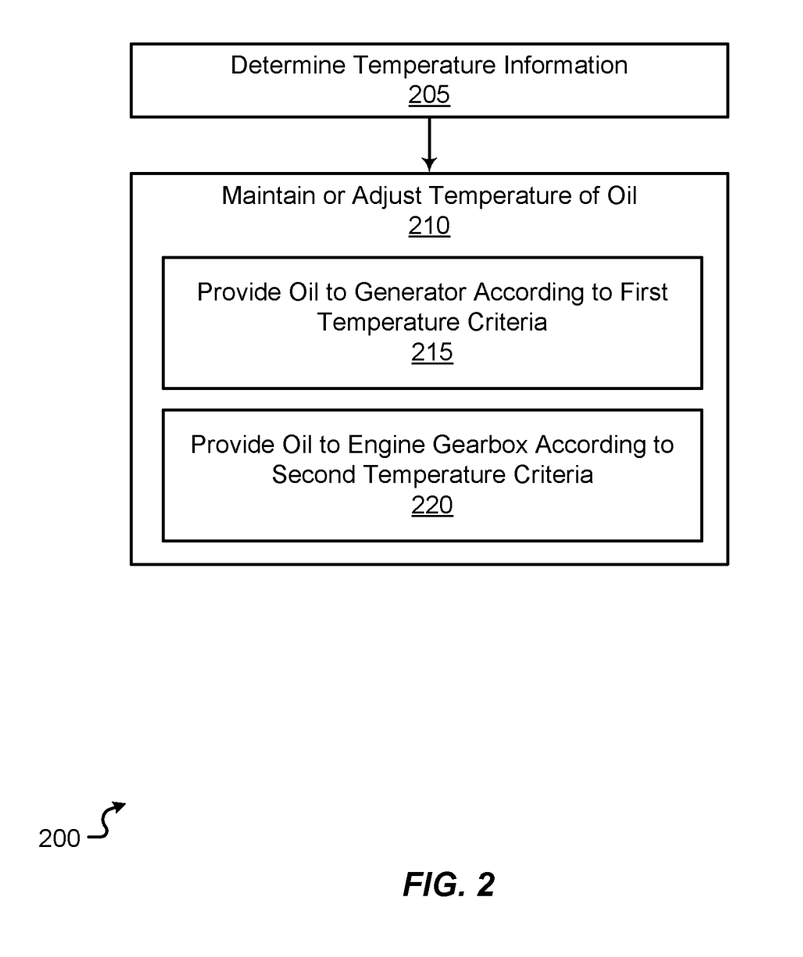
FIG. 2 illustrates an example flowchart in accordance with one or more embodiments of the present disclosure.

FIG. 2 illustrates an example flowchart of a method 200 in accordance with one or more embodiments of the present disclosure. The method 200 may be implemented by the example aspects of an integrated oil system 101 described herein.

At 205, the method 200 includes determining, by a fluid delivery system, temperature information of oil received at an inlet of a heat exchanger system of the fluid delivery system.

At 210, the method 200 includes maintaining or adjusting, by the fluid delivery system, a temperature of the oil based on the temperature information.

In some embodiments, maintaining or adjusting the temperature of the oil includes providing (at 215) the oil to the generator according to first temperature criteria.

In some embodiments, maintaining or adjusting the temperature of the oil includes providing (at 220) the oil to the engine gearbox according to second temperature criteria.

In some embodiments, the method 200 further includes: collecting, by a scavenge pump of the fluid delivery system, at least a portion of the oil from at least one of the generator and the engine gearbox; and providing at least the portion of the oil to a reservoir of the fluid delivery system.

In any one or combination of the embodiments disclosed herein, the method 200 further includes: determining, by the fluid delivery system, at least one of: second temperature information of the oil at a first outlet of the heat exchanger system; third temperature information of the oil at a second outlet of the heat exchanger system; fourth temperature information of the oil at an outlet of the engine gearbox; and fifth temperature information of the oil at an outlet of the generator, wherein maintaining or adjusting the temperature of the oil received at the inlet of the heat exchanger system is further based on at least one of the second temperature information, the third temperature information, the fourth temperature information, and the fifth temperature information.

In any one or combination of the embodiments disclosed herein, the method 200 further includes: determining, by a sensor device, second temperature information of the oil at an outlet of the heat exchanger system; providing, by the fluid delivery system, a control signal to the generator based on the second temperature information, wherein the control signal is associated with conditioning generation of electric power by the generator.

In the descriptions of the flowcharts herein, the operations may be performed in a different order than the order shown, or the operations may be performed in different orders or at different times. Certain operations may also be left out of the flowcharts, one or more operations may be repeated, or other operations may be added to the flowcharts.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the various embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A fluid delivery system comprising:
   a reservoir comprising oil;
   a hydraulic pump in fluid communication with the reservoir;
   a heat exchanger system in fluid communication with the hydraulic pump, a generator, and an engine gearbox;
   a control system; and
   a set of sensor devices configured to provide temperature information of the oil at one or more branches of the fluid delivery system, the one or more branches comprising an inlet of the generator and an outlet of the generator,
   wherein:
   the hydraulic pump is configured to deliver the oil to the heat exchanger system;
   the heat exchanger system is configured to provide the oil according to first temperature criteria to the generator and provide the oil according to second temperature criteria to the engine gearbox; and
   the control system is configured to determine a health of the generator based on:
   temperature information of the oil at the inlet of the generator; and
   temperature information of the oil at the outlet of the generator.

2. The fluid delivery system of claim 1, wherein the generator and the engine gearbox are associated with a gas turbine engine of a vehicle.

3. The fluid delivery system of claim 1, wherein the generator and the engine gearbox are associated with an auxiliary power unit (APU) of a vehicle.

4. The fluid delivery system of claim 1, wherein the heat exchanger system comprises:
   a first heat exchanger configured to provide the oil according to the first temperature criteria to the generator; and
   a second heat exchanger configured to provide the oil according to the second temperature criteria to the engine gearbox.

5. The fluid delivery system of claim 4, wherein the fluid delivery system is configured to direct a cooling medium to the first heat exchanger or the second heat exchanger based on respective priorities associated with the first heat exchanger and the second heat exchanger.

6. The fluid delivery system of claim 1, wherein the heat exchanger system comprises:
   a heat exchanger configured to provide the oil according to the first temperature criteria to the generator and provide the oil according to the second temperature criteria to the engine gearbox.

7. The fluid delivery system of claim 1, further comprising:
   a scavenge pump in fluid communication with the generator, the engine gearbox, and the reservoir, wherein the scavenge pump is configured to:
   collect at least a portion of the oil from at least one of the generator and the engine gearbox; and
   provide at least the portion of the oil to the reservoir.

8. The fluid delivery system of claim 1, wherein the set of sensor devices comprises:
   a first sensor device in thermal communication with an inlet of the heat exchanger system and configured to provide first temperature information of the oil at an inlet of the heat exchanger system;
   a second sensor device in thermal communication with a first outlet of the heat exchanger system and configured to provide second temperature information of the oil at the first outlet of the heat exchanger system;
   a third sensor device in thermal communication with a second outlet of the heat exchanger system and configured to provide third temperature information of the oil at the second outlet of the heat exchanger system;
   a fourth sensor device in thermal communication with an outlet of the engine gearbox and configured to provide fourth temperature information of the oil at the outlet of the engine gearbox; and
   a fifth sensor device in thermal communication with an outlet of the generator and configured to provide the temperature information of the oil at the outlet of the generator,
   wherein the fluid delivery system is configured to:
   maintain or adjust a temperature of the oil as received at the inlet of the heat exchanger system based on the first temperature information of the oil at the inlet of the heat exchanger system, the second temperature information of the oil at the first outlet of the heat exchanger system, and the third temperature information of the oil at the second outlet of the heat exchanger system;
   maintain or adjust a temperature of the oil as received at the inlet of the engine gearbox based on the fourth temperature information of the oil at the outlet of the engine gearbox; and maintain or adjust a temperature of the oil as received at the inlet of the generator based on the temperature information of the oil at the outlet of the generator,
wherein each of the first temperature information, the second temperature information, the third temperature information, the fourth temperature information, and the temperature information of the oil at the outlet of the generator comprises temperature patterns or temperature statistical data of the oil.

9. The fluid delivery system of claim 1, wherein:
the set of sensor devices comprises a sensor device in thermal communication with at least one of an outlet of the heat exchanger system and an inlet of the generator; and
the fluid delivery system further comprises control circuitry coupled to the sensor device and the generator, wherein the control circuitry is configured to condition generation of electric power by the generator, based on temperature information provided by the sensor device.

10. A gas turbine engine system comprising:
a gas turbine engine;
a generator;
an engine gearbox configured to operatively connect the gas turbine engine to the generator; and
a fluid delivery system comprising:
a reservoir comprising oil;
a hydraulic pump in fluid communication with the reservoir;
a heat exchanger system in fluid communication with the hydraulic pump, the generator, and the engine gearbox;
a control system; and
a set of sensor devices configured to provide temperature information of the oil at one or more branches of the fluid delivery system, the one or more branches comprising an inlet to the generator and an outlet of the generator,
wherein:
the hydraulic pump is configured to deliver the oil to the heat exchanger system;
the heat exchanger system is configured to provide the oil according to first temperature criteria to the generator and provide the oil according to second temperature criteria to the engine gearbox; and
the control system is configured to determine a health of the generator based on:
temperature information of the oil at the inlet to the generator; and
temperature information of the oil at the outlet of the generator.

11. The gas turbine engine of claim 10, wherein the heat exchanger system comprises:
a first heat exchanger configured to provide the oil according to the first temperature criteria to the generator; and
a second heat exchanger configured to provide the oil according to the second temperature criteria to the engine gearbox.

12. The gas turbine engine of claim 11, wherein the fluid delivery system is configured to direct a cooling medium to the first heat exchanger or the second heat exchanger based on respective priorities associated with the first heat exchanger and the second heat exchanger.

13. The gas turbine engine of claim 10, wherein the heat exchanger system comprises:
a heat exchanger configured to provide the oil according to the first temperature criteria to the generator and provide the oil according to the second temperature criteria to the engine gearbox.

14. The gas turbine engine of claim 10, further comprising:
a scavenge pump in fluid communication with the generator, the engine gearbox, and the reservoir, wherein the scavenge pump is configured to:
collect at least a portion of the oil from at least one of the generator and the engine gearbox; and
provide at least the portion of the oil to the reservoir.

15. The gas turbine engine of claim 10, wherein the set of sensor devices comprises:
a first sensor device in thermal communication with an inlet of the heat exchanger system and configured to provide first temperature information of the oil at an inlet of the heat exchanger system;
a second sensor device in thermal communication with a first outlet of the heat exchanger system and configured to provide second temperature information of the oil at the first outlet of the heat exchanger system;
a third sensor device in thermal communication with a second outlet of the heat exchanger system and configured to provide third temperature information of the oil at the second outlet of the heat exchanger system;
a fourth sensor device in thermal communication with an outlet of the engine gearbox and configured to provide fourth temperature information of the oil at the outlet of the engine gearbox; and
a fifth sensor device in thermal communication with an outlet of the generator and configured to provide the temperature information of the oil at the outlet of the generator,
wherein the fluid delivery system is configured to:
maintain or adjust the temperature of the oil as received at the inlet of the heat exchanger system based on the first temperature information of the oil at the inlet of the heat exchanger system, the second temperature information of the oil at the first outlet of the heat exchanger system, and the third temperature information of the oil at the second outlet of the heat exchanger system;
maintain or adjust a temperature of the oil as received at the inlet of the engine gearbox based on the fourth temperature information of the oil at the outlet of the engine gearbox; and
maintain or adjust the temperature of the oil as received at the inlet of the generator based on the temperature information of the oil at the outlet of the generator,
wherein each of the first temperature information, the second temperature information, the third temperature information, the fourth temperature information, and the temperature information of the oil at the outlet of the generator comprises temperature patterns or temperature statistical data of the oil.

16. The gas turbine engine of claim 10, wherein:
the set of sensor devices comprises a sensor device in thermal communication with at least one of an outlet of the heat exchanger system and the inlet of the generator; and
the fluid delivery system further comprises control circuitry coupled to the sensor device and the generator, wherein the control circuitry is configured to condition generation of electric power by the generator, based on temperature information provided by the sensor device.

17. A fluid delivery system comprising:
a reservoir comprising oil;
a hydraulic pump in fluid communication with the reservoir;
a heat exchanger system in fluid communication with the hydraulic pump, a generator, and an engine gearbox;
a control system; and
a set of sensor devices comprising:
   a first sensor device in thermal communication with an inlet of the engine gearbox and configured to provide first temperature information of the oil at the inlet of the engine gearbox;
   a second sensor device in thermal communication with an outlet of the engine gearbox and configured to provide second temperature information of the oil at the outlet of the engine gearbox,
wherein:
the hydraulic pump is configured to deliver the oil to the heat exchanger system;
the heat exchanger system is configured to provide the oil according to first temperature criteria to the generator and provide the oil according to second temperature criteria to the engine gearbox; and
the control system is configured to determine a health of the engine gearbox based on:
   the first temperature information of the oil at the inlet of the engine gearbox; and
   the second temperature information of the oil at the outlet of the engine gearbox.

18. The fluid delivery system of claim 17, wherein:
the set of sensor devices further comprises:
   a third sensor device in thermal communication with an inlet of the heat exchanger system and configured to provide third temperature information of the oil at the inlet of the heat exchanger system;
   a fourth sensor device in thermal communication with a first outlet of the heat exchanger system and configured to provide fourth temperature information of the oil at the first outlet of the heat exchanger system; and
   a fifth sensor device in thermal communication with a second outlet of the heat exchanger system and configured to provide fifth temperature information of the oil at the second outlet of the heat exchanger system; and
the fluid delivery system is configured to maintain or adjust a temperature of the oil as received at the inlet of the heat exchanger system further based on one or more of:
   the first temperature information of the oil at the inlet of the engine gearbox;
   the second temperature information of the oil at the outlet of the engine gearbox:
   the third temperature information of the oil at the inlet of the heat exchanger system;
   the fourth temperature information of the oil at the first outlet of the heat exchanger system; and
   the fifth temperature information of the oil at the second outlet of the heat exchanger system.

* * * * *